United States Patent [19]

Inkol

[11] Patent Number: 4,879,561
[45] Date of Patent: Nov. 7, 1989

[54] FILTER SYSTEM FOR RADAR APPLICATIONS

[75] Inventor: Robert J. Inkol, Orleans, Canada

[73] Assignee: Her Majesty the Queen in Right of Canada, Canada

[21] Appl. No.: 239,312

[22] Filed: Sep. 1, 1988

[30] Foreign Application Priority Data

Feb. 4, 1988 [CA] Canada .................................. 558103

[51] Int. Cl.⁴ ............................................... G01S 7/44
[52] U.S. Cl. ..................................... 342/195; 342/13;
364/200; 364/246; 364/900; 364/923.4; 364/966.1
[58] Field of Search ......................... 342/13, 192, 195; 364/200, 900, 724.01

[56] References Cited

U.S. PATENT DOCUMENTS

| | | | |
|---|---|---|---|
| 3,879,727 | 4/1975 | East | 342/192 |
| 4,025,920 | 5/1972 | Reitboeck et al. | 342/13 |
| 4,425,617 | 1/1984 | Sherwood | 364/900 X |
| 4,721,958 | 1/1988 | Jenkin | 342/13 |

FOREIGN PATENT DOCUMENTS 1121036  3/1982  Canada .

Primary Examiner—Thomas H. Tarcza
Assistant Examiner—G. Barrón, Jr.
Attorney, Agent, or Firm—Larson and Taylor

[57] ABSTRACT

A filter system permits observed data measurements for a multiplicity of radar emitters to be deinterleaved and stored in a buffer memory. A first unit of the system simultaneously compares each one of a series of parameters in the incoming data with respective ranges of parameter values, and produces an indicator of each match made. A second unit of the system assigns an hierarchial order to the indicators from the first unit, and produces from those indicators an ordered sequence of encoded outputs. A third unit of the system is a memory divided into a series of areas equal in number to the number of ranges of parameter values. Each one of the memory areas is addressed by a respective one of the encoded outputs of the second unit. The system allows data corresponding to any one of the radar emitters to be efficiently accessed for further analysis.

15 Claims, 11 Drawing Sheets

FILTER SYSTEM FOR RADAR APPLICATIONS

The invention relates to a filter system for radar applications, and more particularly, to a filter system which permits observed data measurements for a multiplicity of radar emitters to be deinterleaved and stored in a buffer memory organized to allow data corresponding to any one of the radar emitters to be efficiently accessed for further analysis.

The receivers in radar electronic support measures (RESM) systems can generate considerable quantities of data in dense electromagnetic signal environments; typically, this data is digitized and formatted into pulse descriptor words (PDWs). These typically include parameters such as time-of-arrival, amplitude, frequency, angle of arrival, and pulse width. The time history of the data corresponding to a discrete emitter can be processed to yield additional information, such as the pulse repetition interval and the scan type and period. These signal parameters can be compared to values in libraries to classify the emitter.

The processing of the raw RESM data is complicated since the PDW time histories of a number of emitters will be interleaved. It is therefore desirable to perform some sorting or filtering of the raw data using information such as frequency, angle-of-arrival and pulse width which can usually be expected to fall into unique sets of ranges or windows for each discrete emitter. The high peak data rates that are possible require that very high speed hardware be used for filtering data. Although the use of highly parallel programmable multiprocessor architectures has been proposed, the relatively simple and repetitive nature of the filtering algorithm favours the use of specialized high speed hardware which can minimize the time overheads associated with the control and intercommunication functions.

It is highly desirable to store some or all of the results of the filtering operation in a memory which is configured to permit access to the PDW data corresponding to the parameter window data set associated with a discrete emitter, preferrably without additional sorting or ordering. Consequently, it is necessary to coherently integrate the filtering and storage functions in a single system. The invention is an implementation of a practical RESM filter subsystem.

In one form, the invention is a filter system for filtering interleaved pulse descriptor words, each of which describes an observed radar signal. The filter system comprises a filter array unit, a first sequential priority encoder unit, and a first memory unit. The filter array unit compares parameters, such as frequency, in each pulse descriptor word with the corresponding member in each of a number of sets of parameter ranges. An indicator output associated with a set of parameter ranges is activated whenever each of the parameters of the pulse descriptor word lies within the corresponding parameter range. The indicator outputs of the filter array unit are connected to the inputs of the first encoder unit. The first encoder unit has an hierarchical order to its inputs and produces an encoded binary output corresponding to that one of its inputs which is active and has priority over other inputs active at that time. The first memory unit is divided into a series of memory areas or bins equal in number to the number of indicator outputs of the filter array unit. Each of the memory areas is addressed by one of the possible binary outputs of the first encoder unit. Each pulse descriptor word is thereby placed into that memory area which corresponds with the priority encoding of the indicator outputs that are activated when the pulse descriptor word is compared with the sets of parameter ranges in the filter array unit. The first encoder unit is designed to allow several active outputs from the filter array unit to be encoded in succession. This permits a pulse descriptor word to be written into more than one of the memory areas if the parameters of the pulse descriptor word correspond to more than one radar emitter.

The filter system may further comprise a second priority encoder unit and a comparator unit. In this arrangement, the second encoder unit functions in a similar manner to the first encoder unit, except that only the highest priority input is encoded. A subset of the indicator outputs of the filter array unit are connected to the inputs of the second encoder unit in reverse order to the order in which those indicator outputs are connected to the inputs of the first encoder unit. The comparator unit compares for each pulse descriptor word the resultant encoded binary output of the first encoder unit with the complement of the resultant encoded binary output of the second encoder unit, and indicates when those compared values are equal.

The filter system may also comprise a first-in first-out second memory unit for storing the interleaved pulse descriptor words. In this arrangement, the filter array unit receives pulse descriptor words from the second memory unit. The second memory unit thereby acts as a buffer for the filter array unit, allowing the filter array unit to operate at a rate independent of the rate at which the pulse descriptor words are received by the second memory unit. Each pulse descriptor word may be comprised of parameters which together define a discrete radar signal emitter unit.

Each memory area of the first memory unit may have a series of storage locations each capable of accepting a pulse descriptor word. In such arrangement, each memory area has a first address pointer for maintaining a record of the storage location address to which a pulse descriptor word was last forwarded. Each time a pulse descriptor word is written to a memory area the first memory area unit automatically increments the first address pointer that is associated with that memory area. In a further arrangement, the first memory unit may also have a second address pointer for each memory area for maintaining a record of the storage location address from which a pulse descriptor word was last read. In such further arrangement, each time a pulse descriptor word is read from a memory area the first memory unit automatically increments the second address pointer that is associated with that memory area.

In a further form of the invention, a first portion of the pulse descriptor word parameters relates to particular signal characteristics and the other parameters relate to general ranges of signal characteristics. In this arrangement, the indicator outputs of the filter array unit are connected to the inputs of the first sequential priority encoder unit in such a manner that any one of the indicator outputs associated with the first portion of the sets of parameter ranges has a higher priority than any one of the indicator outputs associated with the other sets of parameter ranges.

In that form of the invention involving the second encoder unit, the indicator outputs of the filter array unit are connected to the inputs of the second priority encoder unit in such a manner that any one of the indicator outputs associated with the first portion of the sets of parameter ranges has a lower priority than any one of the indicator outputs associated with the other sets of parameter ranges. In this form of the invention, all of the indicator outputs of the filter array unit may be connected to the inputs of the first sequential priority encoder unit, but only those indicator outputs associated with the first portion of the sets of parameter ranges may be connected to the inputs of second priority encoder. Those inputs to the second encoder unit that are not connected to the indicator outputs of the filter array unit are maintained in an inactive state. In this arrangement, the encoded binary output of the first encoder unit is not equal to the complement of the encoded binary output of the second encoder unit when the pulse descriptor word relates only to one of the general ranges of signal characteristics.

A still further form of the invention is a process for filtering interleaved pulse descriptor words. The process comprises the initial step of comparing parameters in a pulse descriptor word with sets of parameter ranges simultaneously. The next step involves activating indicator outputs associated with respective sets of parameter ranges whenever the parameters of the pulse descriptor word are within those respective sets of parameter ranges. Then, the process involves the step of producing, by means of a first sequential priority encoder unit, an encoded binary output from the active indicator outputs of the filter array unit, that encoded binary output corresponding to the active indicator output that is given the highest priority among the active indicator outputs by the first encoder unit. The next step of the process involves storing the pulse descriptor word in a portion of a first memory unit, the number of such portions corresponding to the number of indicator outputs. In that step, the particular portion of the first memory unit into which the pulse descriptor word is stored corresponds to the encoded binary output of the active indicator ouput that is given the highest priority by the first encoder unit.

The process may comprise two further steps. The first further step involves producing, by means of a second priority encoder unit, an encoded binary output from the active indicator outputs of the filter array unit. That encoded binary output corresponds to the active indicator output that is given the highest priority among the active indicator outputs by the second encoder unit. The indicator outputs of the filter array unit are connected to the inputs of the second encoder unit in reverse order to the order in which those indicator outputs are connected to the inputs of the first encoder unit. The second further step involves comparing for each pulse descriptor word the encoded binary output of the first encoder unit with the complement of the encoded binary output of the second encoder unit, and indicating when those compared values are equal.

A first portion of the indicator outputs of the filter array unit may not be connected to the inputs of the second encoder unit. Those unconnected indicator outputs are given the lowest priority by the first encoder unit and the highest priority by the second encoder unit. Those inputs of the second encoder unit to which indicator outputs are not connected are connected instead in such a manner as to remain inactive. With such arrangement, the process comprises the further step of using the compared values from the first and second encoder units to determine when a pulse descriptor word has a value within the ranges of sets of parameter ranges corresponding to indicator outputs within the first portion of the indicator outputs.

The process may comprise the additional step of storing each pulse descriptor word in a first-in first-out second memory unit, that step taking place prior to the step of comparing parameters in each pulse descriptor word with the sets of parameter ranges.

Each portion of the first memory unit may have a series of storage locations each location being adapted to receive a pulse descriptor word. In such arrangement, each first memory unit portion has a first address pointer for maintaining the address of the storage location to which a pulse descriptor word was last written in that first memory unit portion. The process also then comprises the step of incrementing the first address pointer of a first memory unit portion after a pulse descriptor word has been stored in that first memory unit portion. In a still further arrangement, each portion of the first memory unit may have a second address pointer for maintaining the address of the storage location from which a pulse descriptor word was last read from that first memory unit portion. In this further arrangement, the process also comprises the step of incrementing the second address pointer of a first memory unit portion after a pulse descriptor word has been read from that first memory unit portion.

The invention will next be described by means of a preferred embodiment, utilizing the accompanying drawings in which.

Figure 1:
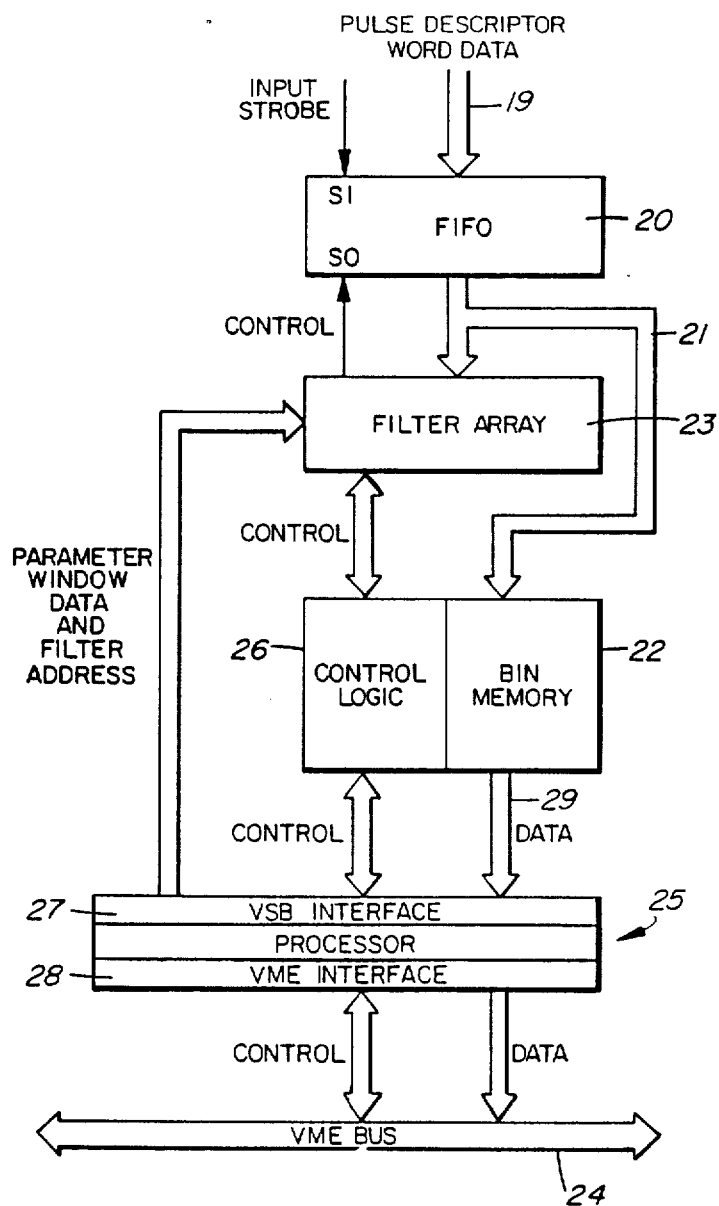
FIG. 1 is a schematic diagram of the architecture of the RESM filter subsystem of the subject invention.

The overall filter subsystem architecture is defined by the block diagram of FIG. 1. An INPUT STROBE signal strobes pulse descriptor word (PDW) data into a first-in first-out (FIFO) memory unit 20. Data leaving FIFO memory unit 20 moves on a bus 21 for storage in a buffer memory unit 22, which is divided into a series of memory areas or bins. The data is compared with parameter data ranges stored in a filter array unit 23 to determine the bin into which the data is stored; each parameter range set corresponds to a respective memory area. Within each memory area, data is written or read using a virtual addressing scheme, the scheme using address pointers which automatically increment. The high and low limits defining the data ranges in filter array unit 23 are loaded by a single-board computer 25

(SBC) operating through a VSB* bus interface 27. Interface 27 is also used by an SBC to retrieve data from bin memory unit 22 by using a simple memory-mapped addressing approach. The SBC 25 can transfer pulse descriptor word data to additional SBCs via VME* bus 24 and VME* bus interface 28 for additional computational capability. Control logic unit 26 maintains for each bin of bin memory unit 22 a first memory pointer for the address of new data written to that bin and a second memory pointer for the address from which data was last written from that bin.

* Trademark

The processor design is optimized to simplify the control and flow of data. The buffering of input PDW data by FIFO memory unit 20 permits the internal operation of the filter subsystem to be synchronized with respect to the VME bus clock. Buses 21, 19 and 29 illustrated in FIG. 1 are specialized full width unidirectional buses. Bin memory unit 22 can be regarded as a multiple circular buffer memory, which simplifies the allocation of filter subsystem internal communication resources and the interface of memory to the VME bus. The filter subsystem can be viewed as a specialized co-processor which requires minimal control and supervision by the SBCs.

The internal operation of the RESM filter subsystem involves few bottlenecks affecting the processing and communication of data, and the functional simplicity permits system operation to be controlled by sequential logic capable of high-speed operation. Efficient use is made of the finite intercommunication resource with, and between, the SBCs provided by the VME bus. Sorted PDW data in bin memory unit 22 that cannot be accessed and processed by the SBCs is eventually overwritten by newer data without being seen by the VME bus or SBC memories. This ensures that the performance of the system: hardware degrades gracefully in highly dense electromagnetic signal environments.

Figure 2:
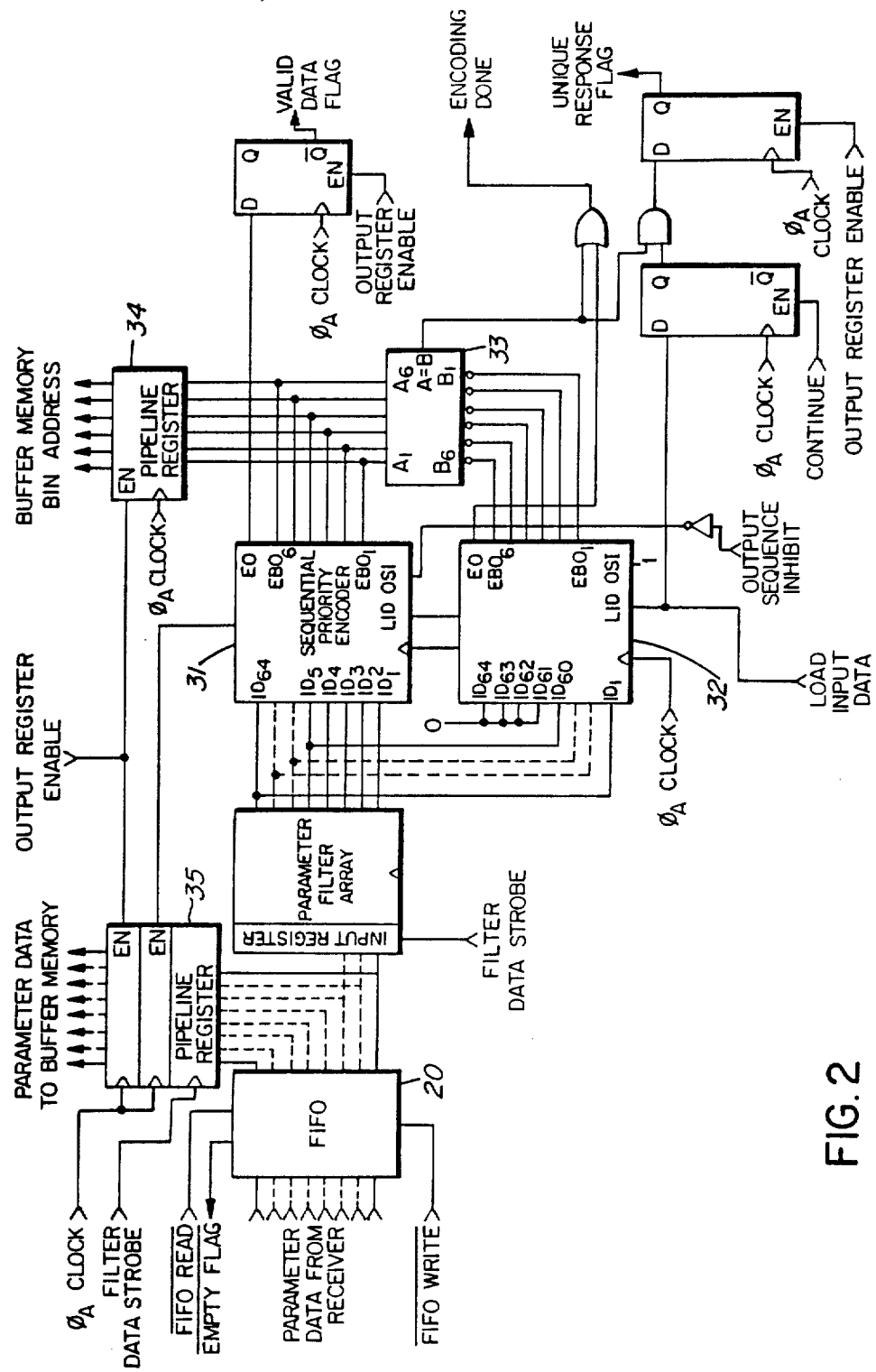
FIG. 2 is a block level diagram of the circuitry of the filter array portion of the RESM filter subsystem.
Figure 3:
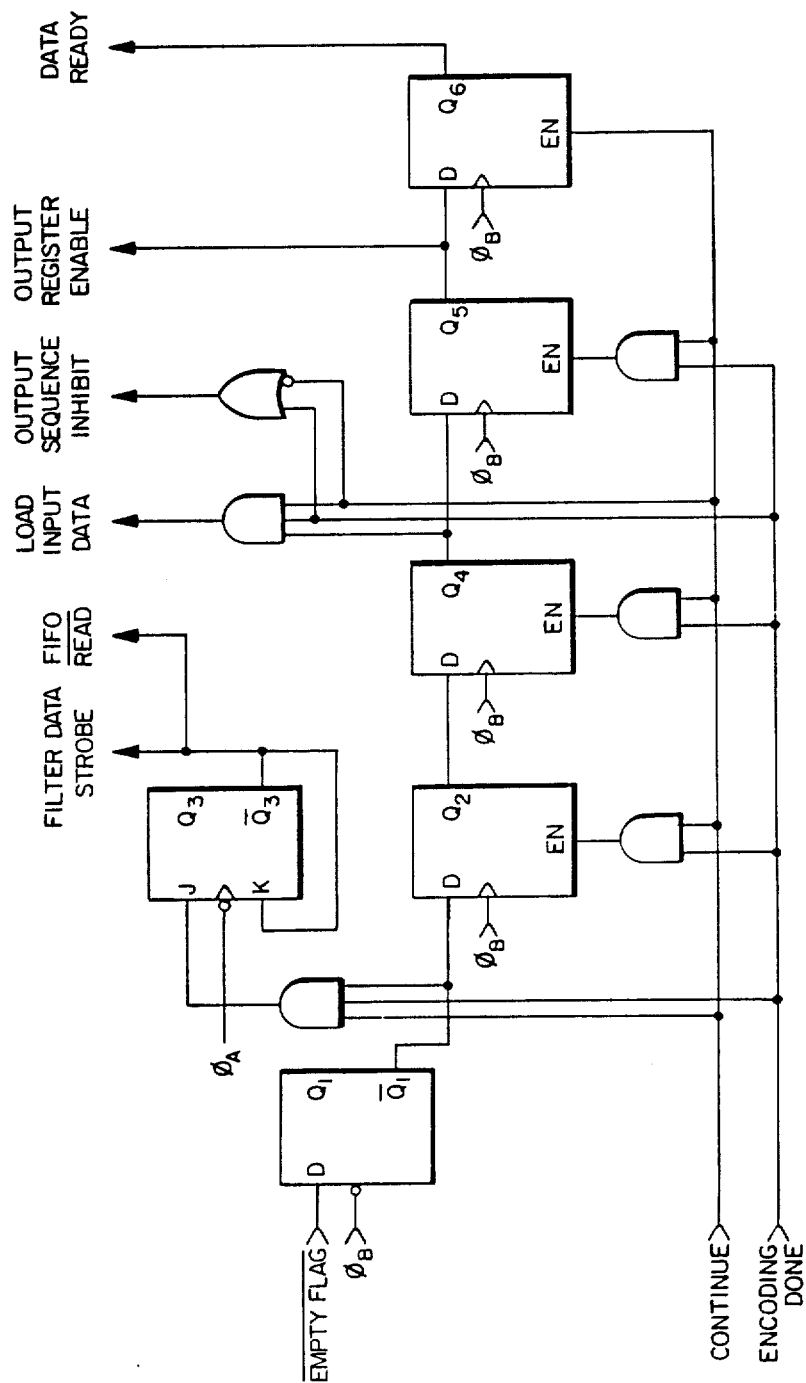
FIG. 3 is a gate level diagram of the digital logic utilized for producing some of the control signals shown in FIG. 2.
Figure 4A:
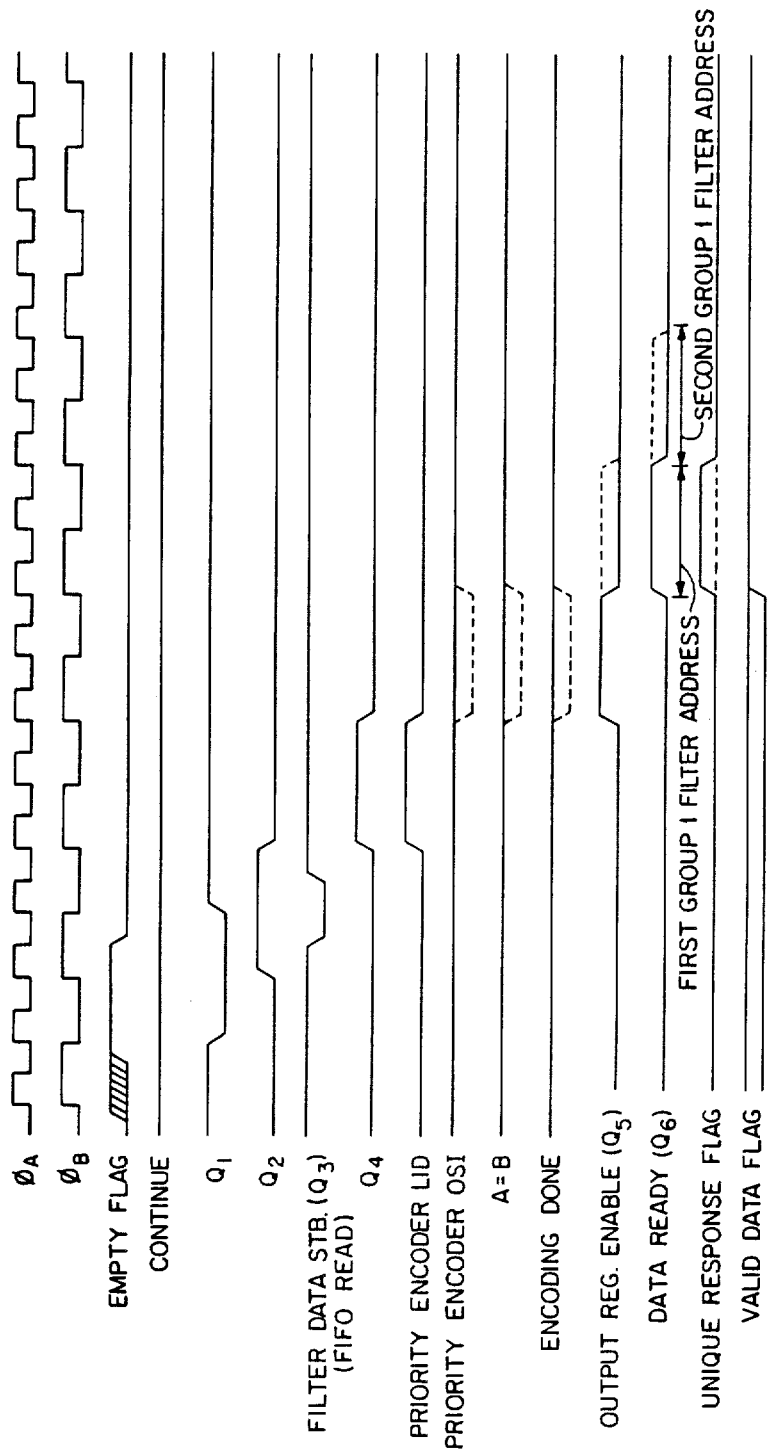
FIGS. 4A and 4B are timing diagrams for the input and output signals involved with the digital logic of FIG. 3.
Figure 4B:
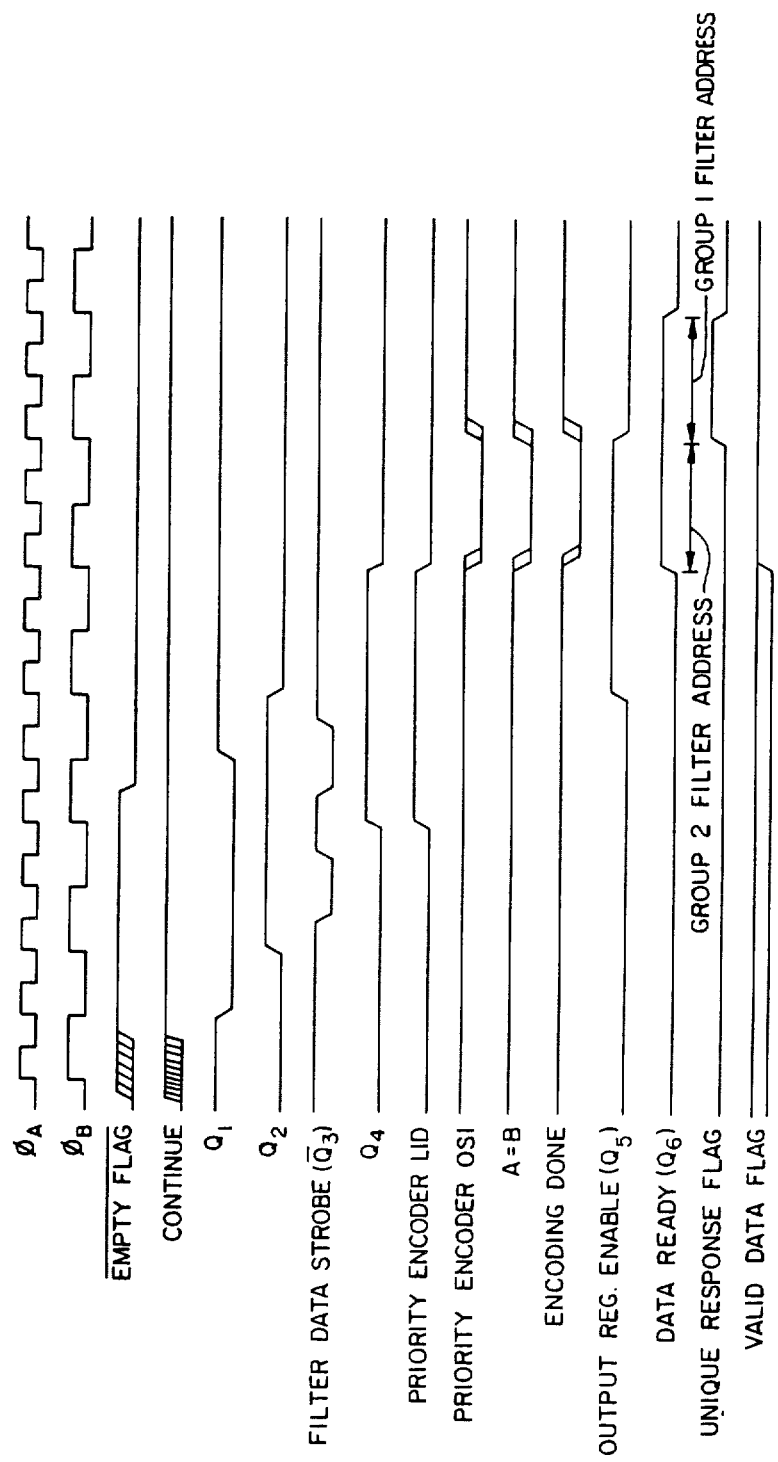

FIGS. 2, 3 and 4 relate to the filter array portion of the RESM filter subsystem. The PDW data is placed into FIFO memory unit 20 when a radar receiving unit (not shown) places data onto the input bus of memory unit 20 and activates the FIFO WRITE line. Data is withdrawn from FIFO memory unit 20 by activation of the FIFO READ line which is controlled by the circuit illustrated in FIG. 3; that circuit utilizes AND and OR logic gates, and JK-type and D-type FLIP FLOPs. FIFO memory unit 20 activates an EMPTY FLAG (EF) signal during any time period when that memory is empty of data; activation of the EMPTY FLAG signal impedes creation of the control signals shown in FIG. 3. The circuit of FIG. 3 produces the control signals illustrated in FIG. 4 which drive the circuit of FIG. 2.

Figure 5:
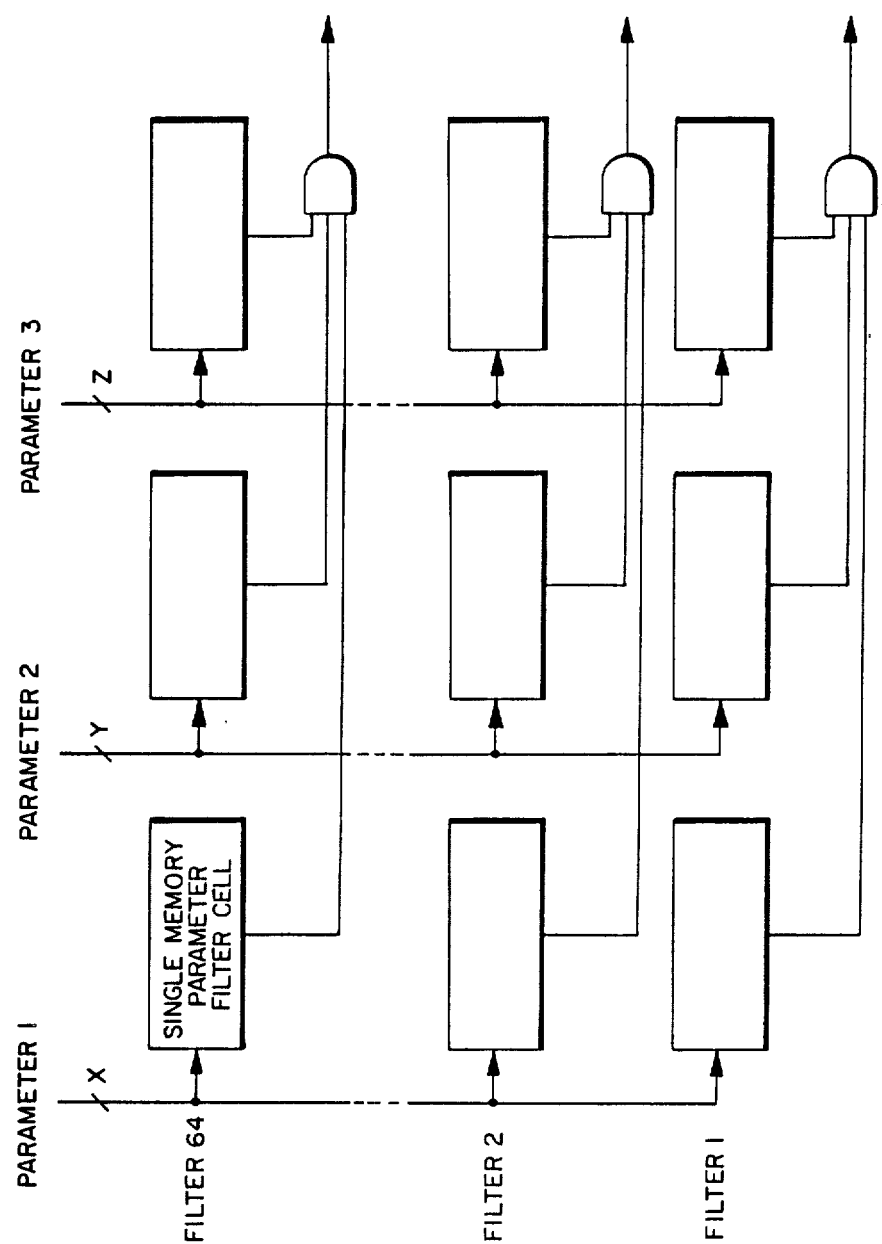
FIG. 5 is a schematic diagram of the filter array unit of the RESM filter subsystem.
Figure 6:
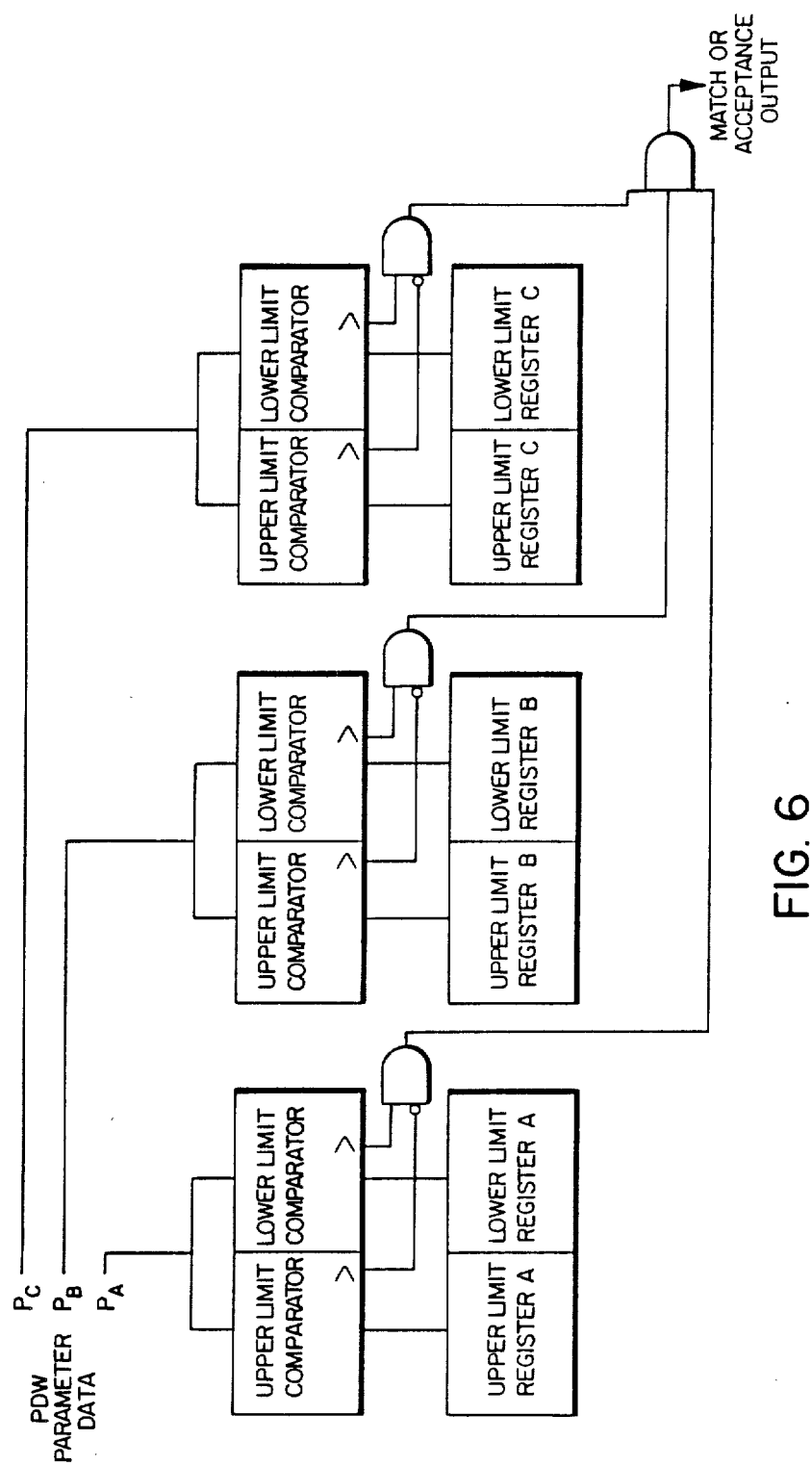
FIG. 6 is a schematic diagram of a word slice architecture for the filter array unit of the RESM filter subsystem.

In the embodiment illustrated in FIG. 2, three groups of data bits out of eight groups of data bits leaving FIFO memory unit 20 enter parameter filter array 30. Each group of data bits represents a different parameter, such as time-of-arrival, amplitude, frequency, angle-of-arrival, and pulse width, Each group is simultaneously compared in parameter filter array 30 with sixty-four ranges of parameter values in the manner illustrated in FIG. 5. In such arrangement, each box in column X represents a comparator cell which is loaded with the upper and lower comparator values for a first parameter, each box in column Y represents a comparator cell which is loaded with the upper and lower comparator values for a second parameter, etc. The minimum and maximum values for each range of parameter values are loaded into parameter filter array 30 by a SBC through VSB bus interface 27. One of the rows of boxes in FIG. 5 is shown in greater detail in FIG. 6, in which three conventional single limit comparators are used to form three comparator cells for comparing three input parameters with the minimum and maximum values for three ranges of parameter values. Each of the three Upper and Lower Limit Registers illustrated in FIG. 6 is loaded by the SBC, although the address and data buses required for that loading have not been shown in either FIG. 5 or 6. Whenever the three parameter values, $P_C$, $P_B$, and $P_C$ are simultaneously within the ranges contained in the respective Upper and Lower Limit Registers, the Acceptance Output is activated.

The control and flow of data is very simple since the loading of the comparator limits and the data inputs into parameter filter array 30 can be by means of uncomplicated parallel buses for which simple timing relationships apply. If the comparator limits and the data inputs are loaded synchronously under the control of a common clock, timing hazards can be avoided. However, it may be impractical to provide sufficient intercommunication to permit the comparator registers to be completely reprogrammed between consecutive input data words. It is then necessary to disable individual comparators while they are being reprogrammed. This avoids the potential problem that the effective size of a window represented by the values in the Upper and Lower Limit Registers of a comparator cell may be temporarily increased if the upper and lower limits are not changed in the correct sequence. The time interval during which the comparators are disabled for reprogramming is sufficiently small that negligible data is lost.

The complexity of parameter filter array 30 may be too great for that device to be implemented on a single integrated circuit. A word slice organization consisting of one or more rows of comparator cells is feasible, although the number of input pins required for PDW data with three or more parameters is appreciable. A slice organization consisting of a column of comparator cells corresponding to a single parameter is better, unless many comparator cells (more than about 32) are to be included in the column. That organization has the advantage that the number of parameters can be efficiently extended to any arbitrary size with the same modular building block. Since the logic performed between comparator cells in a row is the AND function, it is possible to avoid explicit AND gates by using a wired AND connection of outputs.

A problem with the concept of the standardized parameter word slice integrated circuit is that different types of RESM parameter data show large variations in required numerical resolution, ie. a comparator cell sufficiently large for frequency data will unnecessary precision for angle-of-arrival data. However, it is economically undesirable to have different comparator cells for processing data types of different precisions. One solution is to have a modified parameter filter cell structure in which a large comparator cell is created from a pair of interconnected smaller comparator cells each half the size of the large cell; a mode select input determines whether the structure is configured as a large cell or as two independent smaller cells. In the context of the proposed RESM system, 16-bit and 8-bit representations are more than sufficient for frequency and angle-of-arrival/pulse width data, respectively. Consequently, pairs of 16/8-bit parameter slice filters are adequate to handle sets of three parameters. If existing 3-micron CMOS technology is used, a parameter slice integrated circuit is realizable for up to 32 parameters.

With reference to FIGS. 2 and 5, the 64 outputs of parameter filter array 30 are fed into a first sequential priority encoder unit 31. The upper 60 of those 64 outputs are also fed into a second sequential priority encoder unit 32, but in the reverse order to the order to which those outputs are fed into first encoder unit 31. Each sequential priority encoder unit creates an encoded binary output of that input having the highest priority. The four lowest inputs into first encoder unit 31 are not fed into second encoder unit 32; instead, the four highest inputs into second encoder unit 32 are grounded. The four lowest inputs into first encoder unit 31 are connected to acquisition filters in parameter filter array 30, while the other 60 inputs are connected to tracking filters. A tracking filter is associated with a specific radar transmitter; the filter's windows (defined by the upper and lower limits of its comparator registers) are adjusted periodically to track changes in input parameters. The windows of acquisition filters are large in comparison to those for individual tracking filters since they are chosen to include parameters of all possible signals of interest. In general, the windows associated with any tracking filter will be a partial subset of those of the acquisition filter. The primary purpose of the acquisition filters is to identify PDW data which does not correspond to the current windows in any tracking filter. Since the upper 60 of the 64 inputs into first encoder unit 31 relate to tracking filters, the output first encoded will always be that of a tracking filter unless there is no response from one of those filters, in which case an acquisition filter output is encoded. The use of more than one acquisition filter allows them to presort pulse descriptor word data using arbitrary boundaries for frequency or angle-of-arrival.

The outputs of the two priority encoder units 31 and 32 are tested by comparator unit 33 to see if they are mutual complements. If they are, that fact can be used to enable the loading of the next PDW data into the priority encoder; the tracking filter having the highest priority has responded, and acquisition filter outputs can be ignored since at least one tracking filter has responded to the present PDW data. If the encoder outputs are not mutual complements, either: (1) more than one tracking filter has responded, or (2) an acquisition filter rather than a tracking filter has responded. If the A=B output of comparator unit 33 goes low, the UNIQUE RESPONSE FLAG goes low to indicate that a single tracking filter has responded.

Figure 7:
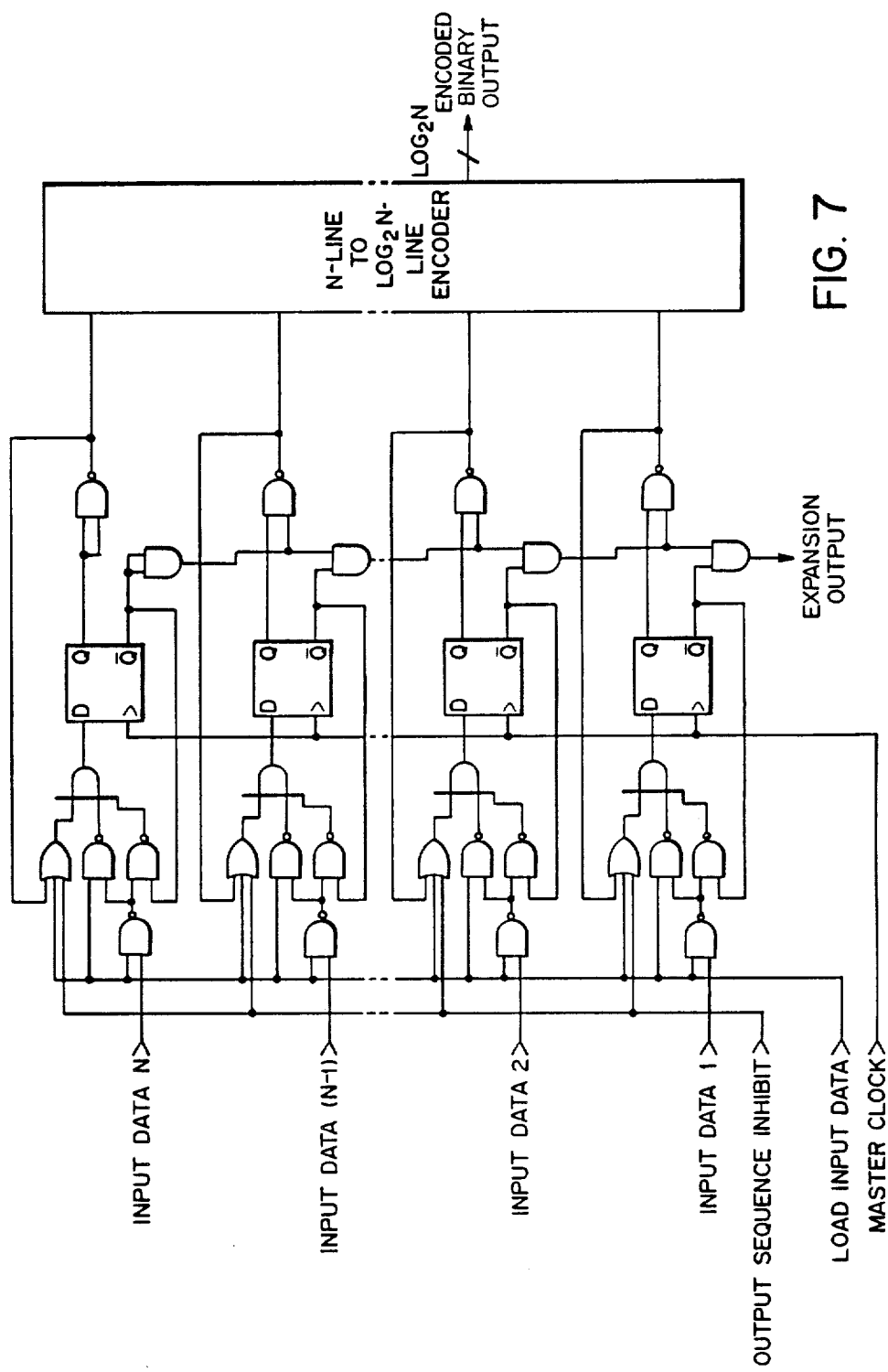
FIG. 7 is a schematic diagram of the priority encoder of the RESM filter subsystem.

The internal wiring of each of the priority encoder units 31 and 32 is illustrated in FIG. 7. The input and output signals shown in FIG. 7 (with N=64) correspond to those shown on each of the priority encoder units 31 and 32 of FIG. 2. ID, LID, OSI, EBO and EO in FIG. 2 correspond to INPUT DATA, LOAD INPUT DATA, OUTPUT SEQUENCE INHIBIT, ENCODED BINARY OUTPUT, and EXPANSION OUTPUT, respectively, in FIG. 7. Each of the priority encoder units 31 and 32 synchronously loads input data when the LOAD INPUT DATA control line is high. A binary output is then encoded which corresponds to the relative position of the highest order active input line. Unless new data is loaded or the operation is inhibited by the OUTPUT SEQUENCE INHIBIT line, the binary output corresponding to the next highest order active input line is encoded on the next clock cycle. A gate array implementation of the concept has been successfully demonstrated using 2-micron double-level-metal CMOS integrated circuit technology.

Figure 8:
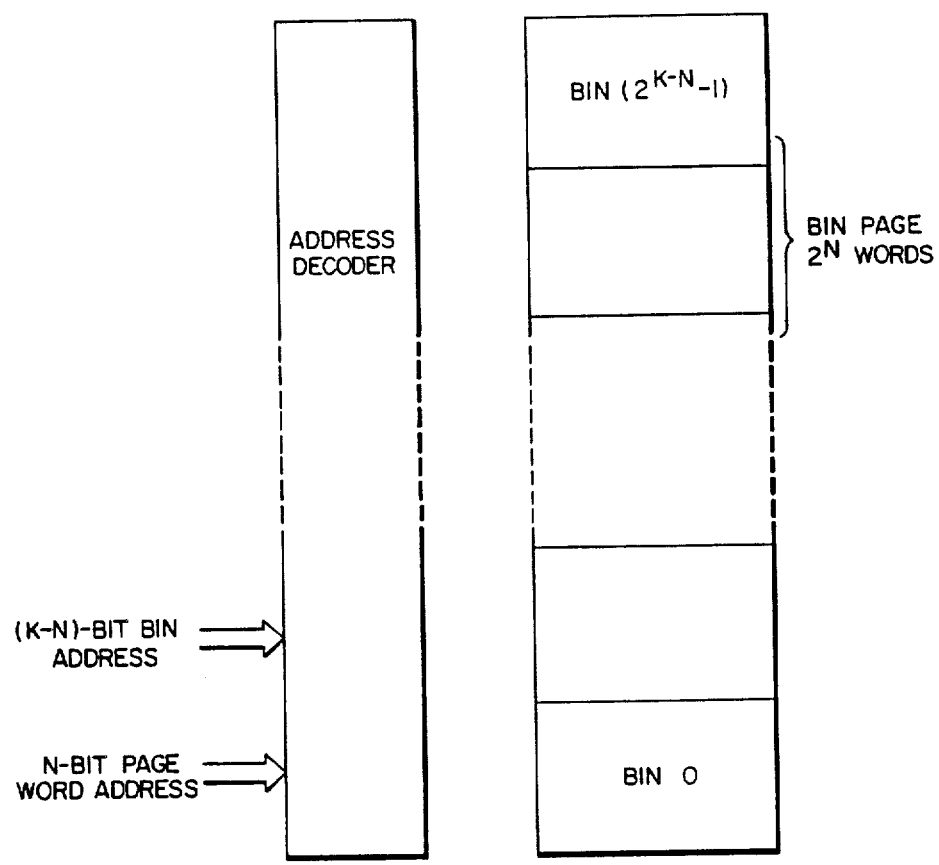
FIG. 8 is a schematic diagram of the partitioning of the bin memory address of the RESM filter subsystem.

The six ($LOG_2 64$) binary outputs of first sequential priority encoder unit 31 are clocked into pipeline register 34, and determine which bin or area of the bin memory will receive the current pulse descriptor word held in pipeline register 35. FIG. 8 is a schematic representation of that bin memory. If the total number of memory addresses in the bin memory is definable by K bits and if each bin of the bin memory has a total number of memory addresses definable by N bits (where K is greater than N), then the number of bins in the bin memory can be defined by (K−N) bits. In the preferred embodiment, the six bits that are clocked into pipeline register 34 are equal to those (K−N) bits, and 64 bins of the bin memory can be addressed by those bits.

Figure 9:
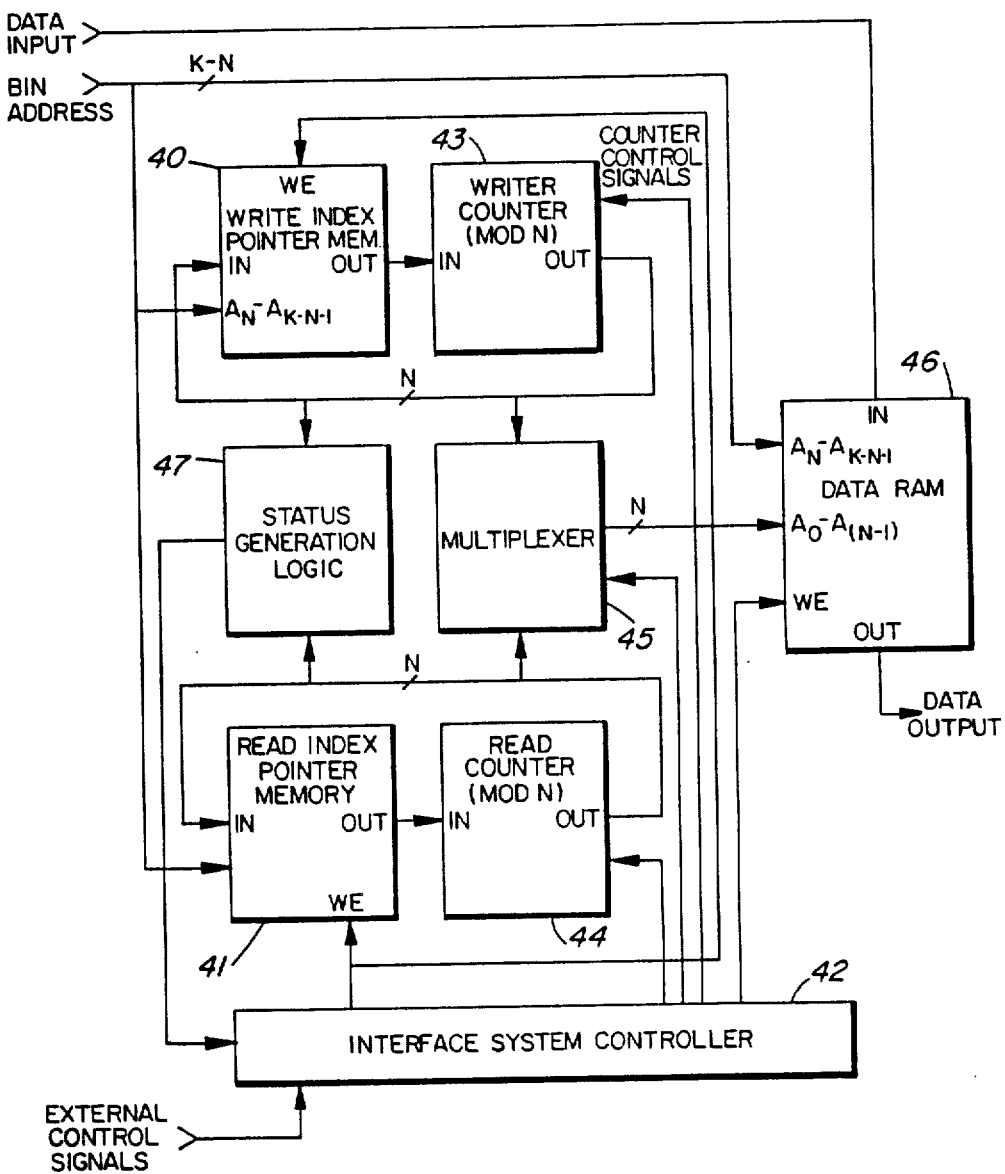
FIG. 9 is a schematic diagram of the circular buffer organization of the bin memory of the RESM filter subsystem.

FIG. 9 illustrates the organization of the bin memory. The DATA INPUT in that drawing is the data word held in pipeline register 35. The BIN ADDRESS in FIG. 9 is the 6-bit encoded output of pipeline register 34. Within each bin of the bin memory, PDW data sent to that bin is written into the bin at an address that is the next one above the address into which the last PDW data was written to that bin; a write index pointer memory 40 maintains a record of that last address for each bin or memory area. That process continues until the top of the address space within the bin is reached, at which time the address is changed to the lowest address within the bin. This process continues, with the oldest data being overwritten by the newest data; the most recent $2^N$ data words are thereby retained in the bin memory. A similar process is used on read operations; a read index pointer memory 41 maintains a record of the last address from which data was read for each bin or memory area. A controller unit 42 prevents the contents of the read index pointer memory 41 from exceeding the corresponding contents of the write index pointer memory 40. The contents of read index pointer memory 41 can be subtracted from that of write index pointer memory 40 to determine the amount of data in a bin. The operation of this form of circular buffer is similar to some RAM-based FIFO memory implementations; the significant difference is that a large number of circular buffers exist in a single memory unit. This arrangement allows the same hardware to be used for handling PDW data associated with either acquisition or tracking filters, and permits high-density RAM organized into 8K-words or more to be efficiently used.

Figure 10:
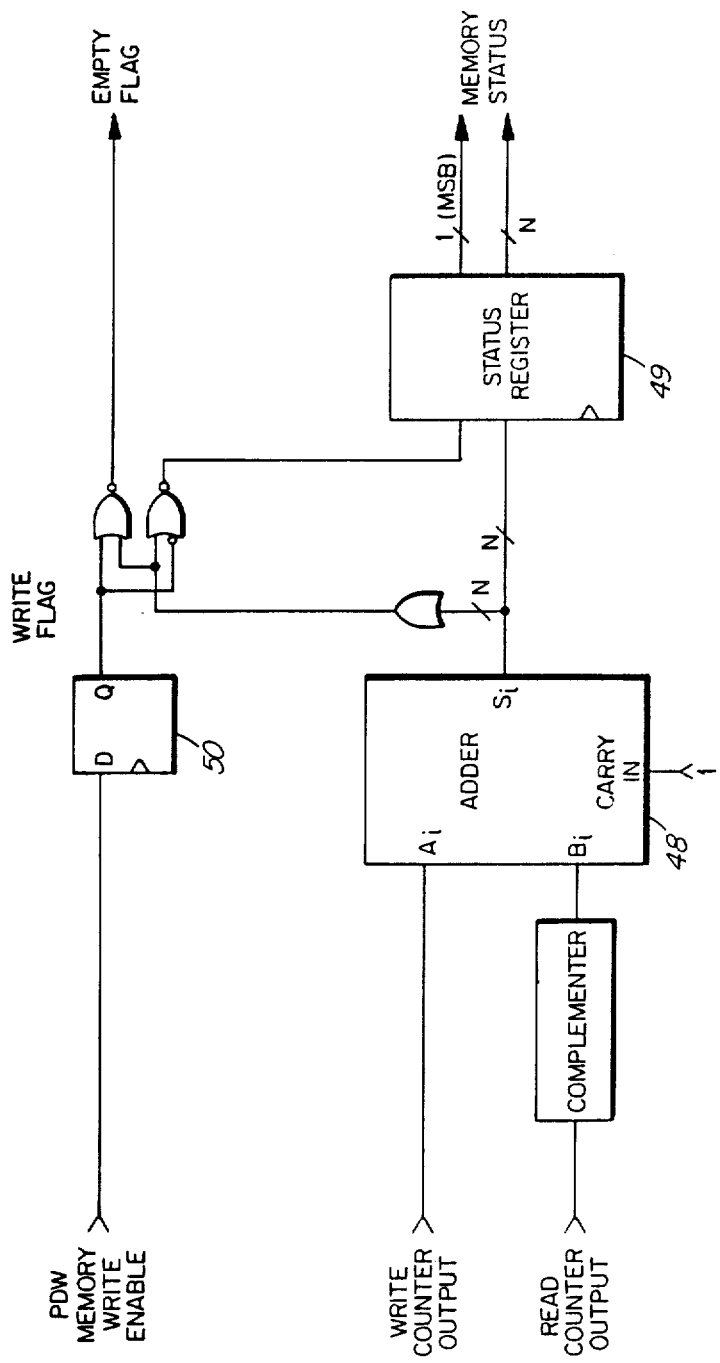
FIG. 10 is a schematic diagram of the status information generator of the RESM filter subsystem.

A write address counter 43 and a read address counter 44 in FIG. 9 are used for incrementing the write index pointer memory 40 and read index pointer memory 41, respectively. Multiplexer 45 is used for routing the desired incremented index address to the bin RAM 46. The status generation logic unit 47 determines the quantity of unaccessed data available in the particular bin. FIG. 10 indicates the circuitry for generating status information, which is different from that generally used for FIFO RAM controller integrated circuits. An adder unit 48 configured for subtraction is used to directly compute the status information from the index address pointers, as shown in simplified form in FIG. 10. The contents of read address counter 44 are complemented and added to the contents of write address counter 43 to generate the correct distance between them. The status information, displayed in status latch 49, requires an additional state since a difference of zero between the contents of the address counters has two possible interpretations—the bin RAM 46 may be empty or full. This is resolved by using a D-latch 50 to hold a WRITE FLAG, which is placed high if the last write operation involved writing new data to bin RAM 46. Incidental advantages of this approach include the availability of information concerning the amount of data available in a bin, and the ability to clear the bin by resetting the address counters 43 and 44.

The sequential logic in controller unit 42 is realizable with a Mealy or other type of state machine. The write and read index pointer memories 40 and 41 can be implemented with standard random access or register file memories. The preferred embodiment utilizes 64 bins each having a capacity of 1024-words. CMOS 64 K-word×1-bit static RAMs such as the Hitachi HM6287* are preferred because of simplicity of use and access times as low as 55 nanoseconds; 64 such memory devices are required for implementing a 64-bit PDW word width. As an alternative, the EDH84H64C-55/70* 64 K-word×4-bit RAMs of Electronic Designs Inc. can be used, the package count thereby being reduced by 48 devices; these devices are hybrid integrated circuits each consisting of four 64 K-word×1-bit RAMs.
6 *Trademark The intercommunication required between the filter subsystem and SBCs is critical to the effective operation of the system. The programming of the sets of windows comprising the filters is relatively straightforward; relatively low data rates are sufficient for realtime programming, and simple memory-mapped input/output techniques can be used without complex handshaking protocols. However, the transfer of PDW data from the bin memories raises a more complex technical issue. In many scenarios, pulse densities exceeding 100,000 pulses per second are postulated, with each pulse resulting in the generation of at least one PDW, which requires a minimum of one 64-bit or two 2-bit words. If individual data parameters are restricted to unique 8, 16, or 32-bit fields to avoid the need for software unpacking algorithms for reformatting data, even larger PDW word widths are required. Thus, the provision of adequate communication resources is important.

Since the PDW data is stored in contiguous memory space in the bin memories, data should ideally be transferred from those memory bins in blocks rather than as individual words; however, most VME-bus SBCs do not provide dedicated DMA hardware nor exploit the sequential-ascending-access data transfer mode, where the transfer of a block of data to consecutive address locations requires only the initial base address to be transmitted. The VME bus has a large theoretical peak data transfer rate (approximately fifty megabytes/second), but the actual rate with practical hardware is considerably less, and the arbitration procedure for allocating intercommunication resources introduces appreciable timing overheads. The preferred embodiment provides a dedicated high-speed parallel communications channel such as the VME* Subsystem Bus (VSB*) to allow a SBC to efficiently program the filters and read the stored PDW data and/or status information. Additional processing can be performed by more than one SBC if desired since data can be transferred to additional SBCs via the VME* bus. Alternatively, PDW data could be transferred to the appropriate SBC directly from the filter subsystem via the VSB* channel.
6 *Trademark

I claim:

1. A filter system for filtering interleaved pulse descriptor words in received radar signals, the filter system comprising:
   (a) a filter array unit for comparing parameters contained in each pulse descriptor word with sets of parameter ranges, the comparison of each parameter with each set of parameter ranges being made simultaneously, the filter array unit having a separate indicator output for each set of parameter ranges, the indicator output associated with a particular set of parameter ranges being activated whenever the compared parameters of the pulse descriptor word match the particular set of parameter ranges;
   (b) a first sequential priority encoder unit having an hierarchical order to its inputs and producing an ordered sequence of encoded binary outputs uniquely corresponding to the inputs which are active at that time, the indicator outputs of the filter array unit being connected to the inputs of the first encoder unit; and,
   (c) a first memory unit divided into a series of memory areas equal in number to the number of indicator outputs of the filter array unit, each of the memory areas being addressed by a respective different one of the possible binary outputs of the first encoder unit; whereby each pulse descriptor word is placed into that memory area which corresponds with the priority encoding of the indicator outputs that are activated when that pulse descriptor word is compared with the sets of parameter ranges in the filter array unit.

2. A filter system for filtering interleaved pulse descriptor words as in claim 1, and further comprising:
   (d) a second priority encoder unit having an hierarchical order to its inputs and producing an encoded binary output of that one of its inputs which is active and has priority over other inputs active at that time, a subset of the indicator outputs of the filter array unit being connected to the inputs of the second encoder unit in reverse order to the order in which those indicator outputs are connected to the inputs of the first encoder unit; and,
   (e) a comparator unit for comparing for each pulse descriptor word the resultant encoded binary output of the first encoder unit with the complement of the resultant encoded binary output of the second encoder unit, and for indicating when those compared values are equal.

3. A filter system as in claim 1, and also comprising a first-in first-out second memory unit for storing the interleaved pulse descriptor words, wherein the filter array unit receives pulse descriptor words from the second memory unit, and wherein the second memory unit acts as a buffer for the filter array unit and allows the filter array unit to operate at a rate independent of the rate at which the pulse descriptor words are received by the second memory unit.

4. A filter system as in claim 1, wherein each memory area of the first memory unit has a series of storage locations each capable of accepting a pulse descriptor word, and wherein each memory area has a first address pointer for maintaining a record of the storage location address to which a pulse descriptor word was last forwarded, and wherein each time a pulse descriptor word is written to a memory area the first memory unit automatically increments the first address pointer that is associated with that memory area.

5. A filter system as in claim 4, wherein the first memory unit also has a second address pointer for each memory area for maintaining a record of the storage location address from which a pulse descriptor word was last read, and wherein each time a pulse descriptor word is read from a memory area the first memory unit automatically increments the second address pointer that is associated with that memory area.

6. A filter system as in claim 1, wherein a first portion of the sets of parameter ranges relates to particular signal characteristics, and wherein the other sets of parameter ranges relate to general signal characteristics, and wherein the indicator outputs of the filter array unit are connected to the inputs of the first sequential priority encoder unit in such a manner that any one of the indicator outputs associated with the first portion of the sets of parameter ranges has a higher priority than any one of the indicator outputs associated with the other sets of parameter ranges.

7. A filter system as in claim 2, wherein a first portion of the sets of parameter ranges relates to particular signal characteristics, and wherein the other sets of parameter ranges relate to general ranges of signal characteristics, and wherein the indicator outputs of the filter array unit are connected to the inputs of the first and second priority encoder units in such a manner that in the first encoder unit any one of the indicator outputs associated with the first portion of the sets of parameter ranges has a higher priority than any one of the indicator outputs associated with the other sets of parameter ranges, and in the second encoder unit any one of the indicator outputs associated with the first portion of the sets of parameter ranges has a lower priority than any one of the indicator outputs associated with the other sets of parameter ranges.

8. A filter system as in claim 7, wherein all of the indicator outputs of the filter array unit are connected to the inputs of the first priority encoder unit, but only those indicator outputs associated with the first portion of the sets of parameter ranges are connected to the inputs of the second priority encoder unit, and wherein those inputs to the second encoder unit that are not connected to the indicator outputs of the filter array unit are maintained in an inactive state, whereby the encoded binary output of the first encoder unit is not equal to the complement of the encoded binary output of the second encoder unit when the pulse descriptor word relates only to one of the general ranges of signal characteristics.

9. A process for filtering interleaved pulse descriptor words in received radar signals, the process comprising the steps of:
(a) comparing parameters in a pulse descriptor word with sets of parameter ranges simultaneously;
(b) activating indicator outputs associated with respective sets of parameter ranges whenever the parameters of the pulse descriptor word are within those respective sets of parameter ranges;
(c) producing, by means of a first sequential priority encoder unit, an encoded binary output from the active indicator outputs of the filter array unit, that encoded binary output corresponding to the active indicator output that is given the highest priority among the active indicator outputs by the first encoder unit; and,
(d) storing the pulse descriptor word in a portion of a first memory unit, the number of such portions corresponding to the number of indicator outputs, the particular portion of the first memory unit into which the pulse descriptor word is stored corresponding to the encoded binary output of the active indicator output that is given the highest priority by the first encoder unit.

10. A process as in claim 9, and comprising the further steps of:
(e) producing, by means of a second priority encoder unit, an encoded binary output from the active indicator outputs of the filter array unit, that encoded binary output corresponding to the active indicator output that is given the highest priority among the active indicator outputs by the second encoder unit, the indicator outputs of the filter array unit being connected to the inputs of the second encoder unit in reverse order to the order in which those indicator outputs are connected to the inputs of the first encoder unit; and,
(f) comparing for the pulse descriptor word the encoded binary output of the first encoder unit with the complement of the encoded binary output of the second encoder unit, and indicating when those compared values are equal.

11. A process as in claim 9, and comprising the further step of storing the interleaved pulse descriptor words in a first-in first-out second memory unit prior to comparing each pulse descriptor word with the sets of parameter ranges.

12. A process as in claim 9, wherein each portion of the first memory unit has a series of storage locations each location being adapted to receive a pulse descriptor word, each first memory unit portion having a first address pointer for maintaining the address of the storage location to which a pulse descriptor word was last written in that first memory unit portion, and wherein the process comprises the further step of incrementing the first address pointer of a first memory unit portion after a pulse descriptor word has been stored in that first memory unit portion.

13. A process as in claim 12, wherein each portion of the first memory unit has a second address pointer for maintaining the address of the storage location from which a pulse descriptor word was last read from that first memory unit portion, and wherein the process comprises the further step of incrementing the second address pointer of a first memory unit portion after a pulse descriptor word has been read from that first memory unit portion.

14. A process as in claim 10, wherein a first portion of the indicator outputs of the filter array unit are not connected to the inputs of the second encoder unit, those unconnected indicator outputs being indicator outputs that are given the lowest priority by the first encoder unit and the highest priority by the second encoder unit, those inputs of the second encoder unit to which indicator outputs are not connected being connected instead in such a manner as to remain inactive, and wherein the process comprises the further step of using the compared values from the first and second encoder units to determine when a pulse descriptor word has a value within the sets of parameter ranges corresponding to indicator outputs within the first portion of the indicator outputs.

15. A filter system as in claim 2, and also comprising a first-in first-out second memory unit for storing the interleaved pulse descriptor words, wherein the filter array unit received pulse descriptor words from the second memory unit, and herein the second memory unit acts as a buffer for the filter array unit and allows the filter array unit to operate at a rate independent of the rate at which the pulse descriptor words are received by the second memory unit.

* * * * *